United States Patent [19]
Reynolds

[11] Patent Number: 5,906,512
[45] Date of Patent: May 25, 1999

[54] ELECTRONICS BOX COAXIAL CONNECTION ASSEMBLY

[75] Inventor: Charles Edward Reynolds, Mechanicsburg, Pa.

[73] Assignee: The Whitaker Corporation, Wilmington, Del.

[21] Appl. No.: 08/983,470
[22] PCT Filed: Jul. 15, 1996
[86] PCT No.: PCT/IB96/00697
§ 371 Date: Dec. 23, 1997
§ 102(e) Date: Dec. 23, 1997
[87] PCT Pub. No.: WO97/04501
PCT Pub. Date: Feb. 6, 1997

[30] Foreign Application Priority Data

Jul. 18, 1995 [GB] United Kingdom ............... 9514641

[51] Int. Cl.[6] ............................................. H01R 17/06
[52] U.S. Cl. ........................................ 439/579; 439/76.1
[58] Field of Search .................................. 439/801, 579, 439/578, 76.1, 76.2, 75

[56] References Cited

U.S. PATENT DOCUMENTS

| | | | |
|---|---|---|---|
| 4,094,574 | 6/1978 | Gunn | 339/177 E |
| 4,226,495 | 10/1980 | Palle et al. | 339/122 R |
| 4,559,421 | 12/1985 | Lapke et al. | 200/51.1 |
| 5,677,578 | 10/1997 | Tang | 307/147 |
| 5,766,026 | 6/1998 | Cooper et al. | 439/76.1 |
| 5,814,905 | 9/1998 | Tang | 307/147 |

*Primary Examiner*—Neil Abrams
*Assistant Examiner*—Michael C. Zarroli
*Attorney, Agent, or Firm*—Driscoll A. Nina; Anton P. Ness

[57] ABSTRACT

An electronics module coaxial connection assembly comprises a plurality of coaxial connectors (10) mounted in a die cast housing (4) that receives printed circuit boards (PCBs) (6,8) therein. The PCBs are interconnected and mounted within the housing (4) of compliant pins that allow assembly in the axial direction (A). Contacts (51,50) mounted along the edge (60) of the PCB (6) have fork-shaped contact arms (56) that plug onto the coaxial centre conductors (32) that project into the cavity area (34) of the housing. This enables connection of the PCB to the coaxial conductors by merely plugging the PCBs into the housing in the axial direction during assembly. Cost-effective manufacture of components and assembly is thus provided.

11 Claims, 3 Drawing Sheets

ELECTRONICS BOX COAXIAL CONNECTION ASSEMBLY

BACKGROUND OF THE INVENTION

1. Field of the Invention

This invention relates to a connection assembly of an electronics box, the box having coaxial connectors.

2. Summary of the Prior Art

In applications such as satellite data reception systems, parabolic antennas capture and concentrate signals which are distributed to a plurality of receivers, for example to different apartments in a building. The signals received by the antenna are typically processed by an electronics module that separates the incoming signal into a plurality of signals. The separate signals may be carried by individual coaxial conductors, either for carrying a plurality of different signals, or for branching the signals to further electronic processing stations that distribute the signals to the various receivers. The electronics module thus requires a plurality of coaxial connections that interconnect the electronic circuitry therein to coaxial supply leads. Such an electronics box typically has an outer housing with a conductive shielding material, the housing may in fact be fully conductive such as die cast metal. It is known to provide a coaxial connector projecting from an edge of the housing, where the housing has a cylindrical projection extending therefrom that forms the outer conductor of the coaxial connector. A cylindrical dielectric part is placed within the tubular outer protrusion, and holds an inner conductor. The outer conductor is interconnected to ground circuit traces of the electronics modules which typically comprise printed circuit boards (PCBs) with components thereon. The coaxial connection typically has to be connected to the PCB.

For many applications, it is important to produce a very cost-effective electronics module. A major cost of many electronics components is due to assembly of the components, in particular if manual operations are required, for example fitting together of the parts or soldering contacts or components. It is nevertheless necessary to achieve a reliable electronics box that has effective shielding against electro-magnetic or electro-static noise reception or emission. It is also important to ensure that a reliable electrical connection can be made to the electronics box. It would be desirable to simplify assembly operations, and in particular automate assembly operations as far as possible.

SUMMARY OF THE INVENTION

From U.S. Pat. No. 3,983,457 there is known an assembly which is suitable from an electronics box and has a housing and a printed circuit board. The housing has a base wall and side walls forming a cavity area receiving the PCB. Two seizure posts are provided proximate an edge of the PCB for electrical and mechanical connection to coaxial centre conductors of in coaxial cable extending transversely to a direction of assembly of the PCB into the housing.

It is an object of this invention to provide a coaxial connection assembly for an electronics box that is cost-effective and reliable.

It is a further object of this invention to provide an electronics box connection assembly for interconnecting coaxial connectors to PCBs of the electronics module in a reliable and effective manner that is also cost-effective to assemble.

Object of this invention have been achieved by providing a connection assembly according to claim 1. Disclosed herein is an electronics box connection assembly having a housing with conductive shielding or ground, and at least one coaxial connector having a mating face at the outside of the housing for connection to a complementary coaxial connector, and an inner end for connection to a circuit board of the electronics module, wherein the board has at least one terminal mounted proximate an edge of the board that is plugged into the centre conductor of the coaxial connector. The housing may comprise a base plate and side walls, where the coaxial connectors are mounted in the side walls and the base plate is substantially parallel to the circuit boards. The base plate would face an open end of the housing where the boards are received in a direction substantially orthogonal to the base plate. The terminals for interconnecting to the coaxial centre conductor, are arranged with respect to the coaxial centre conductor such that during mounting of the board within the housing from the open end, the terminals are plugged to the centre conductor. A simple assembly operation is thus achieved by top mounting the board and simultaneously plugging onto the coaxial centre conductors. The ground connection between the housing shielding and the circuit boards may be provided by having a plurality of grounding terminals, for example one on either side of the terminal for contacting the coaxial centre conductor, that plug into the base of the housing. In the case of a metallic housing, the terminals may have compliant pin sections that plug into recesses in the housing base wall.

BRIEF DESCRIPTION OF THE DRAWINGS

FIG. 1b is a cross-sectional view through line 1b—1b of FIG. 1a;

DETAILED DESCRIPTION OF THE PREFERRED EMBODIMENT

Figure 1B:
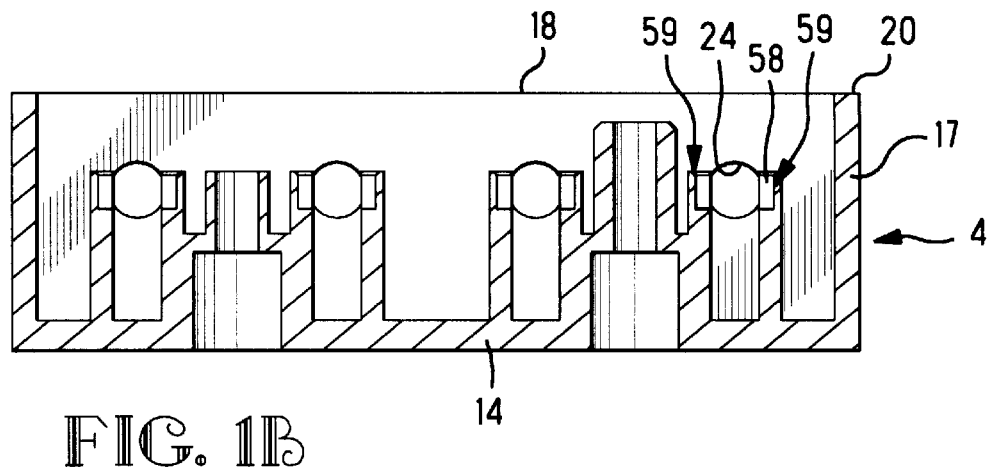
Figure 1A:
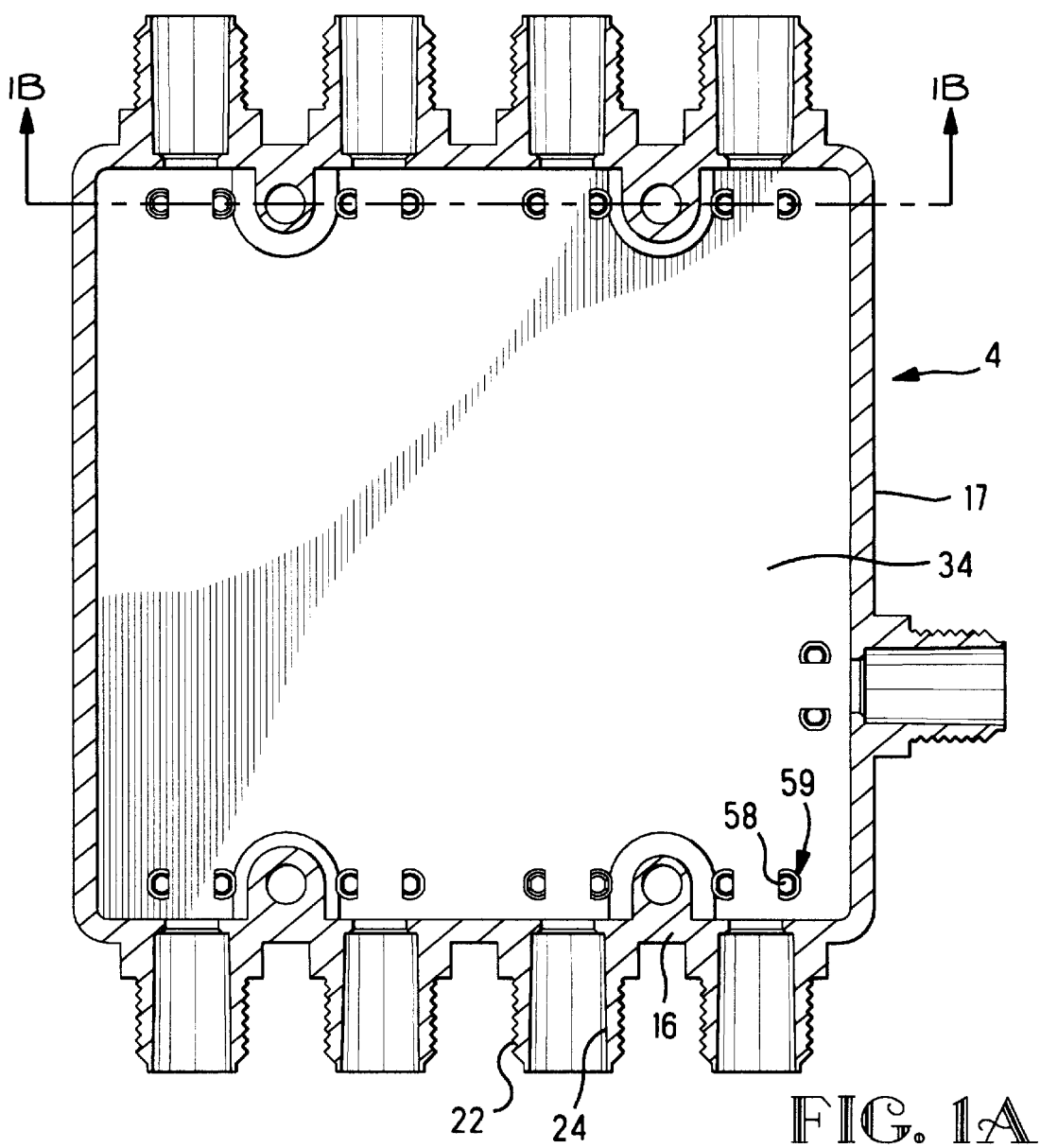
FIG. 1a is a cross-sectional top view of an electronics box housing.
Figure 1C:
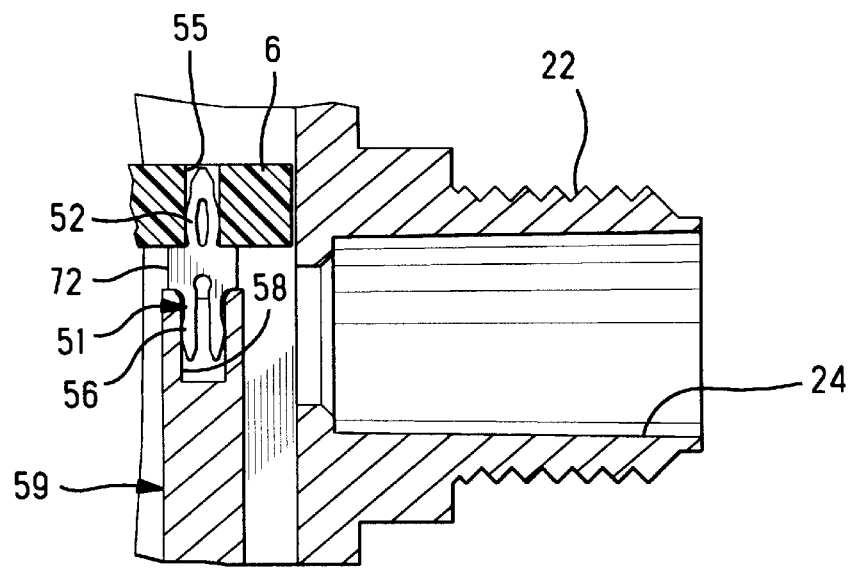
FIG. 1c is a detailed cross-sectional view of a ground terminal on a PCB, grounded to the electronics box housing.
Figure 1D:
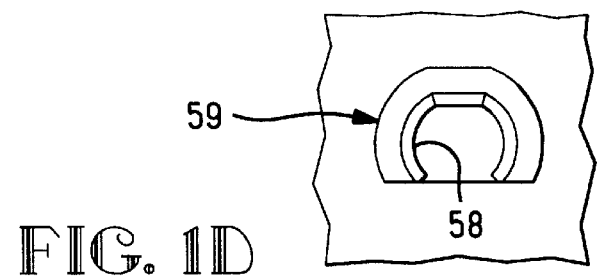
FIG. 1d is a detailed top view of a housing stud for receiving a ground terminal.
Figure 2:
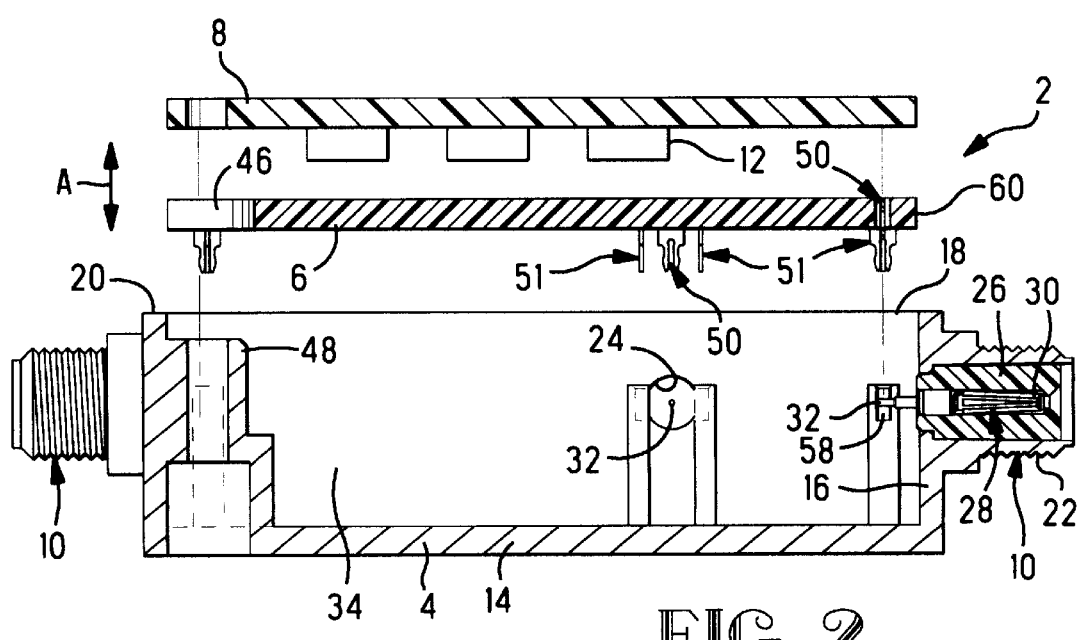
FIG. 2 is a cross-sectional side view of an electronics box with parts disassembled.
Figure 3:
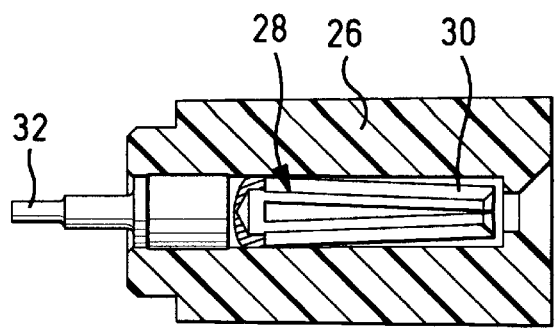
FIG. 3 is an isometric view of part of a coaxial connector.

Referring to FIGS. 1–3, an electronics module 2 comprises a housing 4, a first PCB 6 and a second PCB 8, and a plurality of coaxial connectors 10. The PCBs 6,8 have electric components 12 mounted thereon which are interconnected by conductive circuit traces on the boards. The housing 4 is of a conductive material, such as die cast aluminium alloy, however it would also be conceivable to provide an insulative housing having a conductive shielding layer thereon. The housing 4 has a base wall 14 and side walls 16,17 along a lateral edge of the base wall 14 and extending upwardly therefrom to an open end 18. A cover part (not shown) can be positioned against the upper edge 20 at the open end 18 for closing the components fully within the housing 4.

The side walls 16, 17 comprise tubular extensions 22 forming a cavity 24 for receiving a dielectric 26 therein. The tubular extension 22 comprises the outer conductor of the coaxial connector, where a plurality of coaxial connectors extend from different side walls 16,17. Within the dielectric 26 is a coaxial centre conductor 28 that has a mating end 30 for coupling with a complementary connector and a connection portion 32 that projects into the cavity area 34 formed by the side walls and base wall. The coaxial centre conductors 28 are revolution machined contacts in this embodiment, but could of course be formed by other manufacturing methods.

Figure 4:
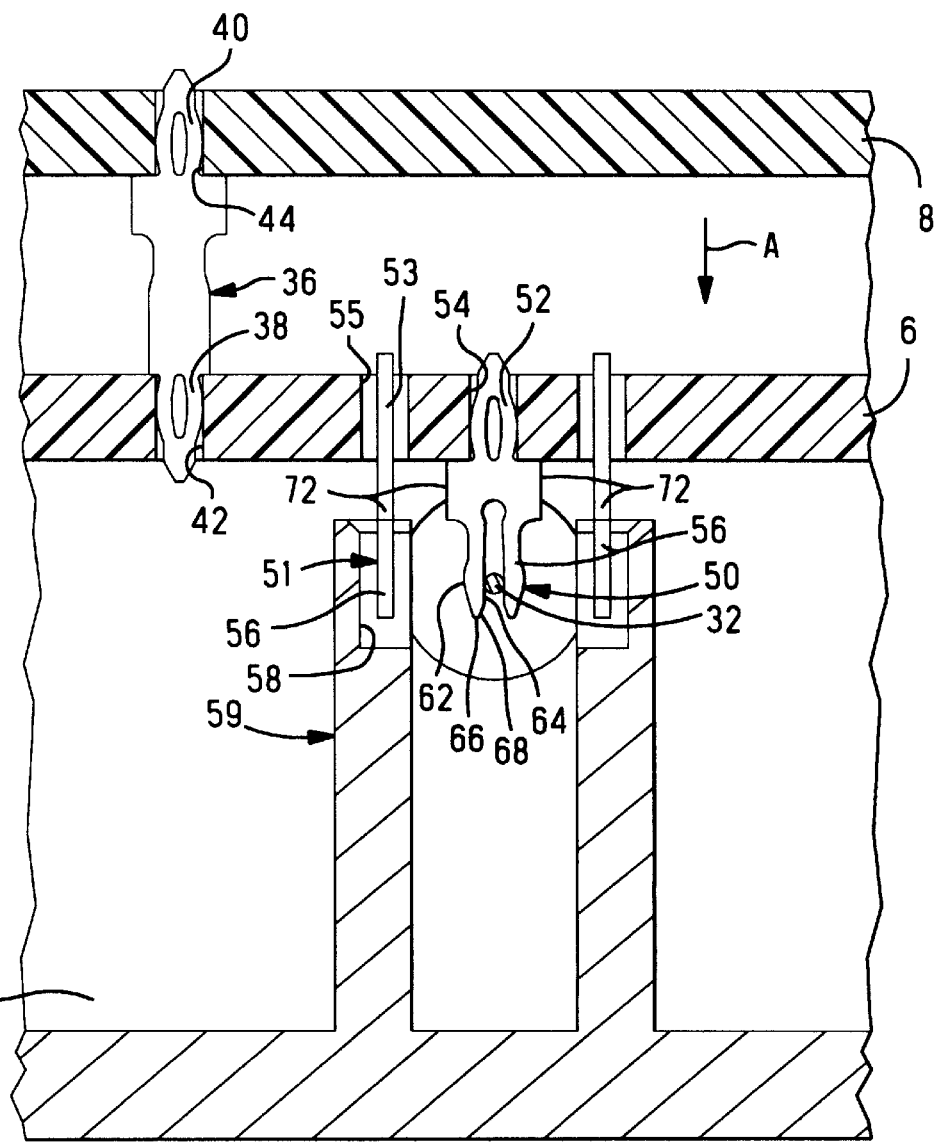
FIG. 4 is a partial cross-sectional view through the electronics box.

Referring to FIGS. 2 and 4, both the circuit boards 6 and 8 substantially fill the surface area within the enclosure 34 and are mounted in a stacked manner one upon the other. The boards are interconnected between each other by board interconnection terminals 36 that have compliant pin contact portions 38,40 at either end for resilient mounting in plated through holes 42,44 of the PCBs 6,8. The circuit board 6 could also be provided with positioning means such as holes 46 cooperable with centering means of the housing such as studs 48 for positioning of the board with respect thereto. Ground contact between the board 6 and the shielding of the housing 4 can be provided by a plurality of grounding terminals 51 that have a compliant pin section 52 for insertion in a plated through-hole 55 of the circuit board 6, and at the other end a fork-shaped pair of cantilever beam contact arms 56 for insertion into a corresponding recess 58 in the base wall. The recess 58 can be provided in a stud 59 projecting up from the base wall, as shown in FIGS. 1a–1d, and FIG. 4. The stud may also provide a means for positioning the circuit board at a precise height above the base wall 14. The recess 58 may either plated with conductive shielding material or simply formed from the metal of the housing if it is die cast. The terminals can be manufactured in a simple manner by edge-stamping from sheet metal.

Centre terminals 50, which may be identical to the grounding terminals 51, are provided for connection to the centre conductor connection portion 32 of the coaxial connectors 10. All terminals 36,50,51 may be formed by edge stamping from sheet metal into substantially planar shapes that are very cost-effective to manufacture.

Both the grounding terminals and the centre terminals for connection to the coaxial centre conductors are positioned along edges 60 of the circuit board 6. The fork-shaped contact arms 56 form a slot 64 and receive the centre conductor connection portion 32 therebetween in a resilient manner for electrical connection thereto. These contact arms can thus be used for contact with their outer edges 62 or slot 64, for contacting ground (in the recess 58) or the coaxial centre conductor connection portion 32 respectively. The arcuate, outwardly-bowed outer edge surface 62 provides the outer contact surface, and also provides a guide means extending towards the free end 66 of the contact arms by the inwardly curved shape for guiding the contact in the recess 58. A tapered lead-in 68 is also provided for guiding the coaxial centre conductor into the contact slot 64. The base wall 14 could also be provided with ribs rather than recesses 58 for insertion in the grounding contact slot 64.

Both the ground and coaxial terminals can be stamped from a single strip of sheet metal and supported by a base strip 70 that is sheared transversely at a central portion 72 between adjacent terminals. Very little scrap material is produced which lowers manufacturing costs of the contacts. An increase in scrap metal resulting from stamping procedures needs a more costly tooling for evacuation of metal, and the scrap also generates handling costs. It is therefore an advantageous feature to separate adjacent terminals by merely shearing them apart rather than separating them by taking out a piece of metal.

Figure 5:
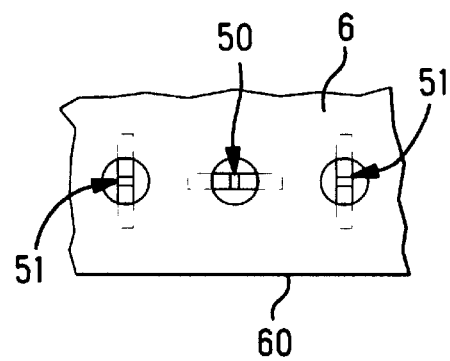
FIG. 5 is a partial top view of a PCB showing terminals for connection to a coaxial connector.

Along the PCB, if adjacent terminals have base portions 70 that are too close together, the ground terminal 51 can be orientated at a different angle to the centre terminal 50 that they flank thereby increasing the gap between adjacent contacts as shown in FIG. 5 where the ground terminals 51 are turned at 90° to the centre terminals 50. The positioning at an angle of the ground terminals may also change the ground and shielding characteristics, the angle (between 0° and 90°) thus providing a means of tuning such characteristics.

Boards 6 and 8 can thus be stacked together in the axial direction A, being interconnected by the contacts 36, and then plugged in the direction A into the housing cavity 34, such that the ground contacts 51 plug into the corresponding ground recesses 58, and the centre terminals 50 plug onto the coaxial centre conductor connection portions 32.

Advantageously therefore, due to the axial mounting of the boards to the housing, with simultaneous plugging to the coaxial conductors, rapid and automated assembly is enabled for a cost-effective solution. Furthermore, the simple edge-stamped circuit board terminals for connection to the coaxial centre conductors and ground are identical and therefore cost-effective to manufacture, but nevertheless ensure reliable contact.

I claim:

1. An electronics box connection assembly having a housing and a printed circuit board (PCB) mountable in the housing, the housing comprising a base wall and side walls upstanding therefrom to form a cavity area for receiving the PCB therein, the connection assembly comprising one or more coaxial connectors extending through one or more of the sidewalls for interconnecting the PCB to a complementary coaxial connector external to the electronics box, wherein the connection assembly comprises one or more terminals mounted proximate an edge of the PCB and pluggable to one or more coaxial centre conductors of the one or more coaxial connectors in a direction of assembly of the PCB into the housing.

2. The connection assembly of claim 1 wherein the coaxial centre conductor comprises a connection end projecting into the cavity area below the terminal for plugging connection therewith, the connection end extending transversely to the assembly direction.

3. The connection assembly of claim 2 wherein the terminal comprises fork-shaped contact arms that form a slot for resiliently receiving the connection end of the coaxial centre conductor therein.

4. The connection assembly of claim 3 wherein the terminal is substantially planar and stamped from sheet metal, comprising a compliant pin section for mounting in a conductive through-hole of the PCB.

5. The connection assembly of claim 3 wherein a base section of the terminal intermediate the compliant pin section and contact arms forms part of a carrier strip interconnecting the terminals during manufacture, the outer edge of the base section being sheared at the centre position between adjacent terminals during manufacture.

6. The connection assembly of claim 1 wherein one or more grounding terminals are mounted on the PCB for interconnecting the PCB to the ground pole of the one or more coaxial connector(s), the grounding terminals pluggably connected to the housing in the direction of assembly.

7. The connection assembly of claim 6 wherein the grounding terminal is identical to the terminal for connection to the coaxial centre conductor.

8. The connection assembly of claim 6 wherein a plurality of grounding terminals are mounted along the edge of the PCB, where each terminal for connection to the centre conductors is flanked on either side by a grounding terminal.

9. The connection assembly of claim 8 wherein the grounding terminals are mounted at an angle with respect to the terminal for connection to the coaxial centre conductor such that the grounding terminals are oriented in a plane transverse to a plane of the terminal.

10. The connection assembly of claim 1 wherein board interconnection terminals are provided for interconnecting two PCBs stacked one upon the other in the direction of assembly, the interconnection terminals having compliant pin sections on either end for mounting in conductive through-holes of the PCBs, the interconnection terminals being substantially planar.

11. An electronics box connection assembly having a housing and a printed circuit board (PCB) mountable in the housing, the housing comprising a base wall and side walls upstanding therefrom to form a cavity area for receiving the PCB therein, the connection assembly comprising one or more coaxial connectors mounted within and extending through one or more openings through the walls of said housing for interconnecting the PCB to a complementary coaxial connector external to the electronics box and having respective centre conductors having projections extending into the housing and exposed therein for mating, wherein the connection assembly comprises one or more terminals mounted proximate an edge of the PCB and pluggable to one or more coaxial centre conductors of the one or more coaxial connectors in a direction of assembly of the PCB into the housing.

* * * * *